United States Patent Office 3,549,712
Patented Dec. 22, 1970

3,549,712
COUPLING OF PHENOLS WITH QUINOL ETHERS
Allan S. Hay and Hans-Dieter Becker, Schenectady, N.Y., assignors to General Electric Company, a corporation of New York
No Drawing. Filed Jan. 12, 1968, Ser. No. 697,310
Int. Cl. C07c *39/12;* C07d *3/00*
U.S. Cl. 260—620   6 Claims

ABSTRACT OF THE DISCLOSURE

Phenols having the formula

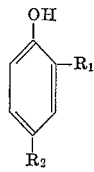

readily react with spiro quinol ethers having the formula

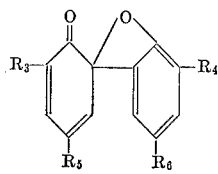

in the liquid phase to produce 4,4′,6,6′-tetra-substituted o,o′-biphenols where the substituents of both of the reactants and the product are tertiary alkyl groups having 4 to 8 carbon atoms. The biphenols are useful as plasticizers, antioxidants, polymerization inhibitors for ethylenically unsaturated monomers, etc. A portion of the biphenol may be oxidized back to the spiro quinol ether and used to couple more of the phenol to the biphenol. The biphenol products can be dealkylated to either a 4,4′-disubstituted o,o′-biphenol or completely dealkylated to o,o′-biphenol. The dealkylated biphenols readily react with dicarboxylic acids, diacyl halides or phosgene to produce polyesters, polycarbonates, etc.

---

This invention relates to the preparation of 4,4′,6,6′-tetra-substituted o,o′-biphenols by a process which comprises reaction a 2,4-disubstituted phenol with a 3,3′,5,5′-tetra-substituted spiro quinol ether in the liquid phase. The substituents on both of the reactants and the product are tertiary alkyl groups having from 4 to 8 carbon atoms.

In the reaction, two moles of the phenol are oxidatively coupled together through the unsubstituted ortho position to form a biphenol and simultaneously the quinol ether is reduced to a biphenol. The biphenol produced from the phenol can be identical with or different from the biphenol produced from the spiro quinol ether.

Since the substituents on the biphenol product are tertiary alkyl groups, these products are readily dealkylated which removes the tertiary alkyl groups. The olefin produced in the dealkylation reaction may be recovered and used to produce the starting tertiary alkyl substituted phenols.

Biphenols, especially those from 2,4-di-(tertiary alkyl) phenols, have found wide utility as oxidation inhibitors, especially in the petroleum industry as stabilizers for cracked gasoline. Since they are reduced agents they have found application in photography. They have also been used as plasticizers for cellulose ethers. Those biphenols in which the hydroxyl group is not hindered by a large bulky substituent in the ortho positions, i.e., they are not so-called cryptophenols, may be used in the preparation of resins, e.g., polyesters, polycarbonate, etc. resins, wherein they are used as the dihydroxy compound which is reacted either with phosgene, dibasic acids, dibasic acid halides, polyepoxides, polyurethanes, etc.

Previous to our invention, o,o′-biphenols have been rather difficult to produce because of the involved procedure required, the tendency to produce undesirable by-products or the extremely long reaction time required. Perhaps the most simple method disclosed in the prior art is that involving the reaction of oxygen with a 2,4-di-(tertiary alkyl)phenol in the presence of alkali. However, this reaction requires large quantities of alkali, in excess of the amount of phenol, which then must be neutralized with acid before isolation of the desired biphenol. This reaction requires a long time, and the use of pressurized equipment. These factors coupled with the large amount of caustic and acid required, greatly adds to the cost of production.

It is known that 2,4-di-(tertiary alkyl)phenols can be oxidized in the liquid phase to spiro quinol ethers. The oxidation agent described by Müller et al. in Liebigs Ann. 645, 25 (1961) is alkaline potassium ferricyanide, but metal oxides, such as, manganese dioxide, nickel peroxide, lead peroxide or quinones having a high oxidation potential, such as, chloranil may also be used. These oxidizing agents must be used in large amounts based on the amount of phenol. Oxygen in conjunction with a catalytic amount of a basic cupric salt-tertiary amine complex provides a very economical and efficient means for oxidative coupling of the 2,4-di-(tertiary alkyl)phenols to the spiro quinol ether. These amine complexes are readily made by passing oxygen into a solution of a cuprous salt and a tertiary amine or by adding one equivalent of a base per mole of copper to a solution of a cupric salt in a tertiary amine.

We have unexpectedly found that the spiro quinol ethers readily react with 2,4-di-(tertiary alkyl)phenols, whereby two molecules of a phenol are coupled to form the corresponding biphenol, while at the same time, one molecule of the spiro quinol ether is reduced also forming a biphenol without the formation of any second product as shown by the following equation.

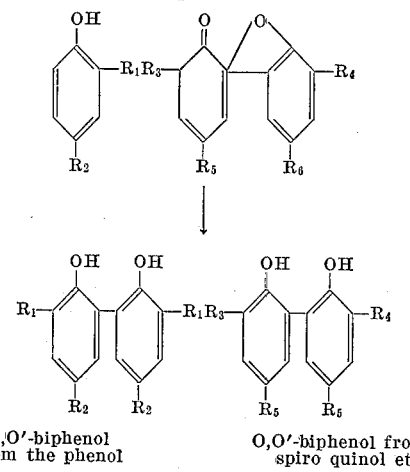

o,o′-biphenol from the phenol
o,o′-biphenol from the spiro quinol ether

If each of the alkyl groups represented by $R_1$, $R_3$ and $R_4$ are identical and each of the alkyl groups represented by $R_2$, $R_5$ and $R_6$ are identical, then the same biphenol will be produced from each reactant.

From the above equation it is also evident that there is no second product of the reaction. The two hydrogens required for the conversion of the oxygens in the spiro quinol ether to the two hydroxyl groups in the o,o′-biphenol are supplied, in essence, by the hydrogen in the unsubstituted ortho position of the two molecules of the phenol. The reaction is, therefore, an oxidation-reduction reaction whereby the phenol is oxidized, i.e., oxidatively coupled, and the spiro quinol ether reduced to the biphenol.

The reaction requires no catalyst and proceeds rapidly in the liquid phase to produce the product in high yield. The liquid phase may be obtained either by using an inert solvent which is a mutual solvent for the reactants or by heating a mixture of the reactants to a temperature where they are both molten. If a solvent is used the reaction proceeds at room temperature but the reaction can be hastened by heating. Therefore we generally heat the reaction mixture to temperatures of from 50° C. preferably to 100° C., up to the reflux temperature of the reaction mixture. Pressure is not required but may be used if desired.

The solvent does not need to be a solvent for the biphenol product. In fact, very good solvents to use are the liquid lower alkyl carboxylic acids, e.g., acetic, propionic, butyric, etc., acids. These solvents readily dissolve the reactants, and are solvents for the biphenol when hot but are poor solvents when cold. Their use therefore, permits the product to be readily isolated by filtration while the solvent can be reused since there are no by-products to be removed. Since the recovered solvent is saturated with the biphenol product, its reuse permits higher yields to be recovered in the subsequent reactions. However, solvents, e.g., benzene, toluene, xylene, etc. can be used in which both the reactants and the product are soluble and the product recovered in the usual way, for example by adding a non-solvent, evaporation, etc.

The spiro quinol ether may be made either by oxidatively coupling a di-(tertiary alkyl)phenol as discussed previously or a portion of the biphenol product may be oxidized to the spiro quinol ether by the same procedure. By using either method, and using oxygen and the amine-cuprous salt complex system as the oxidizing agent, the net result of the entire reaction is the conversion of the 2-4-di-(tertiary alkyl)phenols into o,o'-biphenols with the only feed materials being the phenols and oxygen. Such a process allows the biphenols to be prepared not only in very high yields, but at very low cost.

The phenols and spiro quinols ethers which can be used as starting materials are those having the formulas given in the above equation wherein the R substituents on both the phenol and spiro quinol ether are tertiary alkyl groups having from 4 to 8 carbon atoms. By a tertiary alkyl group we mean those alkyl groups having a tertiary α-carbon atom, i.e., the carbon atom which is bonded to the ring in the above formula has three alkyl substituents thereon, i.e., has the formula

where $R_a$, $R_b$ and $R_c$ are alkyl groups with the total number of carbon atoms being 4 to 8. Typical examples are, tert-butyl, tert-amyl, 1,1-dimethylbutyl, 1-ethyl-1-methylpropyl, 1,1-dimethylpentyl, 1-ethyl-1-methylbutyl, 1,1-diethylpropyl, 1,1-dimethylhexyl, 1-ethyl-1-methylpentyl, 1,1-diethylbutyl, 1,1,2-trimethylpropyl, 1,1,2-trimethylbutyl, 1,1,2-trimethylpentyl, 1,1,3-trimethylbutyl, etc., i.e., the isomeric tertiary hexyls, heptyls and octyls.

As mentioned previously, the biphenol products may be readily dealkylated to remove the tertiary alkyl substituents. The reaction of a phenol with a tertiary-alkyl group precursor as well as the dealkylation of the alkylated phenol to produce the dealkylated phenol and the olefin is an equilibrium reaction in which the alkylation reaction is favored by the use of superatmospheric pressures, and relatively low temperatures, whereas the dealkylation reaction is favored by the use of atmospheric or subatmospheric pressure, high temperature and removal of the olefin from the reaction, e.g., by distillation. Those alkylation catalysts which are ortho-directing for the alkylation process are the phenoxy derivatives of such elements as aluminum, magnesium, iron, zinc, phosphorus, zirconium, titanium, bismuth, tin, etc. where the phenoxy moiety may be the phenol radical itself, the cresoxy radical, the xyloxy radical, etc. The preferred phenoxy derivatives are those of aluminum and magnesium, with aluminum being somewhat preferable to that of magnesium. For the dealkylation reaction, any of the above ortho-directing alkylation catalysts may be used. Under dealkylation conditions with basic catalysts, the tertiary alkyl groups in the ortho position with respect to the phenolic hydroxyl group generally will be removed first and thereafter the tertiary alkyl groups in the para position will be removed. To remove the para substituents, it is required to heat to a higher temperature than is required to remove the substituents in the ortho position or to use an acidic catalyst. Acids or acid salts, for example, sulfuric acid, phosphoric acid or acid-esters, acidified clays, aryl sulfonic acids, aluminum chloride, zinc chloride, etc., which are predominantly para-directing catalysts when used as an alkylation catalyst, may be used for the dealkylation reaction and are preferred when all of the tertiary alkyl substituents are to be removed from our biphenol products.

Since the reaction with the tertiary alkyl group precursor and the phenol is an equilibrium reaction, the dealkylating reaction is favored by those reaction conditions which expel the olefin from the reaction vessel, for example, distillation or reduction of pressure, with venting of the gas from the vessel. The reaction is usually favored by use of heat and/or the use of larger amounts of catalyst. The conditions and the carrying out of the dealkylation of phenols is well known in the art and details may be found, for example, in the U.S. 3,091,646—Leston, British Pat. 591,547—Fishel, British Pat. 591,796 Gilbert et al.; Ind. Eng. Chem. 35, 655 (1943), etc. The disclosure of these references are incorporated herein by reference.

In order that those skilled in the art may better understand our invention, the following examples are given by way of illustration and not by way of limitation. In all of the examples, all parts and percentages are by weight unless stated otherwise.

EXAMPLE 1

This example illustrates the preparation of the spiro quinol ether from a 2,4-di-(tertiary-alkyl)phenol. In a reaction vessel equipped with a high-frequency vibrating stirrer and thermometer, there was placed 250 ml. of ethanol, 50 g. of 2,4-di-tert-butylphenol, 2 g. of cuprous chloride and 3 ml. of N,N,N',N'-tetramethylethylenediamine. After a homogeneous solution was obtained, oxygen was passed into the reaction mixture. No heat was applied to the reaction mixture, but an exothermic reaction occurred, which caused the reaction mixture to heat to 45° C. After 6.5 hours, during which time a precipitate had formed in the reaction mixture and the temperature of the reaction mixture had returned to room temperature, the flow of oxygen was stopped. The reaction vessel was cooled in an ice-bath and filtered. Without any attempt to recover additional product from the reaction solution, there was obtained 42.9 g. of the spiro quinol ether, 3,3', 5,5' - tetra - tert - butyl-spiro(3,5-cyclohexadiene-1,8'[7] oxabicyclo[4,2,0]octa[1,3,5]trien)-2-one, having a melting point at 156–162° C. (literature 152–154° C.), showing that the product produced by this method, even without recrystallization, was purer than that obtained after recrystallization by the prior art process which used alkaline potassium ferricyanide.

EXAMPLE 2

This example illustrates the reaction of the spiro quinol ethers with the 2,4-di-(tertiary-alkyl)phenols to produce the o,o'-biphenols, in the absence of a solvent. A mixture of 75 g. of 2,4-di-tert-butylphenol and 75 g. of the spiro quinol ether identical with that of Example 1, was heated to 150° C. While heating to this temperature, the mixture melted forming a homogeneous solution which solidified when the temperature of the reaction mixture reached 150° C. The product was recrystallized from acetic acid yielding 118 g. of 4,4',6,6'-tetra-tert-butyl-o,o'-biphenol having a melting point of 199° C.

EXAMPLE 3

This example illustrates the use of acetic acid as a solvent for the making of the biphenol product. A solution of 127 g. of the spiro quinol ether identical with that of Example 1 and 130 g. of 2,4-di-tert-butyl-phenol in 250 ml. of acetic acid was heated at reflux for 2 hours. On cooling, a white precipitate formed which was removed by filtration. Without any further attempt to recover any of the product from the acetic acid, there was obtained 199 g. of 4,4',6,6'-tetra-tert-butyl-o,o'-biphenol. Since the acetic acid filtrate is saturated with the product, when used in a subsequent reaction, it will give a still higher yield of the biphenol.

EXAMPLE 4

This example illustrates the reoxidation of some of the biphenol product back to the spiro quinol ether which can then be used to couple more of the phenol. In a reaction vessel as described in Example 1, there was placed 250 ml. of ethanol, 1 g. of cuprous chloride, 2 ml. of N,N,N',N'-tetra-methylethylenediamine and 50 g. of 4,4',6,6'-tetra-tert-butyl-o,o'-biphenol. After a homogeneous solution was formed, oxygen was passed through the vigorously stirred solution for 2.5 hours. The reaction mixture which was initially an intense purple color was now a light green solution in which the spiro quinol ether was suspended. The product was removed by filtration and without any further attempt to obtain product from the filtrate, there was obtained 46 g. of the spiro quinol ether, 3,3',5,5' - tetra - tert-butyl-spiro(3,5-cyclohexadiene-1,8'-[7]oxabicyclo[4,2,0]octa[1,3,5]-trien)-2-one, having a melting pont of 157–159° C. This example and Example 1, therefore illustrate two means by which the spiro quinol ethers of this invention may be prepared from the corresponding 2,4-di-(tertiary-alkyl)-phenols.

EXAMPLE 5

This example illustrates the dealkylation of the tertiary alkyl groups in the two positions ortho to the hydroxyl groups of the biphenol. In a reaction vessel equipped with a condenser, magnetic stirrer and heating mantle, there was placed 300 g. of p-cresol and 3 g. of aluminum foil. The reaction mixture was heated reflux until the aluminum dissolved. After cooling to room temperature, there was added 300 g. of 4,4',6,6'-tetra-tert-butyl-o,o'-biphenol. A reflux condenser cooled with solid carbon dioxide and a Dean-Stark trap as receiver were added on top of the condenser and the reaction mixture heated to reflux. Over a period of 12 hours, there was obtained 128 ml. of isobutylene which had distilled from the reaction mixture. After cooling, the product was recrystallized from acetic acid yielding 114 g. of 4,4'-di-tert-butyl-o,o'-biphenol, having a melting point of 209° C. (Literature 207–8° C.) By substituting an acid catalyst for the aluminum p-cresoxide in the above example, all of the tert-butyl groups can be removed producing o,o'-biphenol. Likewise, the 4,4'-di-tert-butyl-o,o'-biphenol obtained in this example may be further treated with an acid catalyst to dealkylate it to o,o'-biphenol.

In the same manner as illustrated above, the other di-(tertiary-alkyl)phenols of this invention may likewise be converted to their corresponding spiro quinol ethers and to the corresponding o,o'-biphenols.

As mentioned previously, the biphenols produced by our invention can be used as antioxidants for petroleum products, for example, cracked gasoline or in rubbers or other synthetic polymers. They can also be used as plasticizers for cellulose ethers. They likewise may be readily deakylated as illustrated in Example 5, and these deakylated products may be used as the dihydroxy component for the producing of polyesters, polycarbonates, diglycidyl ethers, useful in the making of epoxy resins, etc. or reacted with formaldehyde to produce phenolic resins.

Although the above description has shown many modifications and variations of the present invention, other modifications and variations are possible in light of the above teachings. It is therefore to be understood that changes may be made in the particular embodiments which are described and which are within the full intended scope of the invention defined by the appended claims.

What we claim as new and desire to secure by Letters Patent of the United States is:

1. The process of producing an o,o'-biphenol which comprises reacting, in the liquid phase, a phenol having the formula

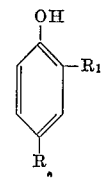

with a spiro quinol ether having the formula

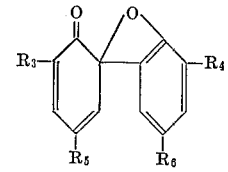

where $R_1$, $R_2$, $R_3$, $R_4$, $R_5$ and $R_6$ are tertiary alkyl groups having from 4 to 8 carbon atoms.

2. The process of claim 1 wherein $R_1$, $R_3$ and $R_4$ are identical tertiary alkyl groups and $R_2$, $R_5$ and $R_6$ are identical tertiary alkyl groups.

3. The process of claim 1 wherein the substituents of the phenol and spiro quinol ether are identical tertiary alkyl groups.

4. The process of claim 1 wherein the biphenol product is 4,4',6,6'-tetra-tert-butyl-o,o'-biphenol, and the R substituents in both the phenol and spiro quinol ether are tert-butyl.

5. The process of claim 1 wherein the biphenol product is dealkylated after it is prepared to remove at least the R substituents which are ortho to the hydroxyl groups of the biphenol.

6. The process of claim 1 wherein the biphenol is dealkylated after it is formed to remove all of the R substituents.

References Cited

UNITED STATES PATENTS 3,153,090 10/1964 Boag _____ 260—620
3,355,504 11/1967 Coffield et al. _____ 260—624

BERNARD HELFIN, Primary Examiner

N. P. MORGENSTERN, Assistant Examiner

U.S. Cl. X.R.

260—333

UNITED STATES PATENT OFFICE
CERTIFICATE OF CORRECTION

Patent No. 3,549,712     Dated   December 22, 1970

Inventor(s)   Allan S. Hay and Hans-Dieter Becker

It is certified that error appears in the above-identified patent and that said Letters Patent are hereby corrected as shown below:

Column 2, line 58,   change "O,O'-biphenol" (both occurrences to -- o,o'-biphenol --

Claim 1, line 4,   change the formula to read:

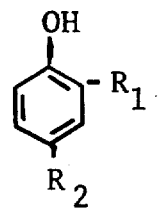

Signed and sealed this 29th day of June 1971.

(SEAL)
Attest:

EDWARD M. FLETCHER, JR.          WILLIAM E. SCHUYLER, JR.
Attesting Officer                Commissioner of Patents